(12) United States Patent
Schwarz

(10) Patent No.: US 6,592,285 B1
(45) Date of Patent: Jul. 15, 2003

(54) VIBRATION-DAMPING CONNECTION ARRANGEMENT FOR TWO COMPONENTS CAPABLE OF BEING MOVED AGAINST ONE ANOTHER

(75) Inventor: Helmut Schwarz, Weil der Stadt (DE)

(73) Assignee: Schwarz Verbindungs-Systeme GmbH, Althengstett (DE)

( * ) Notice: Subject to any disclaimer, the term of this patent is extended or adjusted under 35 U.S.C. 154(b) by 0 days.

(21) Appl. No.: 09/717,112

(22) Filed: Nov. 22, 2000

(30) Foreign Application Priority Data

Nov. 23, 1999 (DE) ................... 299 20 496 U

(51) Int. Cl.[7] ................ F16F 1/373; F16F 15/04; F16F 15/02
(52) U.S. Cl. ................ 403/179; 403/52; 403/53; 403/326; 403/329; 403/224; 248/632; 248/634; 248/635; 248/638
(58) Field of Search ............ 403/52, 53, 179, 403/224, 326, 329; 248/632, 635, 638, 621, 634

(56) References Cited

U.S. PATENT DOCUMENTS

| | | | | |
|---|---|---|---|---|
| 1,905,540 A | * | 4/1933 | Whitehouse | 248/635 X |
| 2,224,186 A | * | 12/1940 | Henri-Labourdette | 296/96.21 |
| 2,639,173 A | * | 5/1953 | Olson | 403/53 X |
| 2,912,212 A | * | 11/1959 | Lowe | 248/638 X |
| 3,012,801 A | * | 12/1961 | Cole | 403/52 X |
| 4,066,058 A | | 1/1978 | Anderkay | |
| 4,067,531 A | | 1/1978 | Sikula | |
| 4,074,491 A | | 2/1978 | Bell et al. | |
| 4,726,699 A | * | 2/1988 | Buschmann et al. | 400/690 |
| 5,129,768 A | | 7/1992 | Hoyle et al. | |
| 5,366,200 A | | 11/1994 | Scura | |
| 5,950,277 A | | 9/1999 | Tallmadge et al. | |

FOREIGN PATENT DOCUMENTS

| | | |
|---|---|---|
| DE | 1095059 | 12/1960 |
| DE | 19725826 | 12/1998 |
| EP | 0636808 | 2/1995 |
| GB | 1582148 | 12/1980 |

* cited by examiner

Primary Examiner—Gregory J. Binda
Assistant Examiner—Ernesto Garcia
(74) Attorney, Agent, or Firm—Greenblum & Bernstein, P.L.C.

(57) ABSTRACT

A vibration-damping device is provided for removably connecting a first and second component. The device includes a holding arm adapted to be attached to the first component; a receiving element adapted to be attached to the second component; and at least one vibration-damping element of elastic material coupled to the holding arm. The holding arm is insertable into the receiving element, whereby the at least one vibration-damping element is slidable along at least a surface of the receiving element.

13 Claims, 3 Drawing Sheets

VIBRATION-DAMPING CONNECTION ARRANGEMENT FOR TWO COMPONENTS CAPABLE OF BEING MOVED AGAINST ONE ANOTHER

CROSS-REFERENCE TO RELATED APPLICATIONS

The present application claims priority under 35 U.S.C. § 119 of German Patent Application No. 299 20 496.0, filed on Nov. 23, 1999, the disclosure of which is expressly incorporated by reference herein in its entirety.

BACKGROUND OF THE INVENTION

Field of the Invention

The invention refers to an arrangement for detachably connecting two components, which are capable of being moved against one another. Connection arrangements of this type are used particularly for detachably mounting interior panelling in aircraft and road vehicles, i.e. so-called "movable bearings". They facilitate quick connection of elements and allow simple dismantling of these elements for repair and maintenance.

SUMMARY OF THE INVENTION

An aspect of the invention is to provide a vibration-damping movable bearing. According to this aspect, a vibration-damping connection arrangement for two components capable of being moved against one another is provided. The invention includes a holding arm connected or capable of being connected with a first component, and a receiving element for the holding arm connected or capable of being connected with a second component that is provided. The holding arm projects into a receiving element, and is connected with at least one vibration-damping element of elastic material which is located on a side touching the receiving element and is capable of sliding along the side of the receiving element.

According to another aspect of the present invention, the holding arm is connected or capable of being connected with the first component that is provided, and a receiving element for the holding arm connected or capable of being connected with the second component that is provided. The holding arm projects into the receiving element, and the receiving element is joined with at least one vibration-damping element of elastic material which is located on the side touching the holding arm and is capable of sliding along the receiving element.

In another aspect, the vibration-damping element is connected with a sliding head. According to a further aspect of the invention, the vibration-damping element is cylindrical or in the form of a vibration-damping ring. In another aspect of the present invention, at least one sliding element is capable of siding along the receiving element of which is not directly connected with the holding arm, wherein the sliding element is located in the opening of the vibration-damping ring.

According to a still further aspect of the present invention, the holding arm has a tongue-like device, and a hole for receiving the vibration-damping ring wherein the receiving element is in the form of a hollow section. Further aspects of the invention include a holding arm having a piston-like device and holes for receiving vibration-damping rings wherein the receiving element is in the form of a hollow cylinder.

According to an aspect of the present invention, the vibration-damping ring has a concentric peripheral groove in which the edge of an opening hole in the holding arm is located. According to another aspect of the present invention, the vibration-damping ring has a concentric peripheral groove in which the edge of an opening hole in the receiving element is located.

Additionally, other aspects of the present invention include a sliding element having a head which rises above the opening of the vibration-damping ring. In another aspect of the present invention, the head of the sliding element is convex in shape. According to a further aspect of the present invention, a sliding element is located on both sides of the opening of the vibration-damping ring. In another aspect of the present invention, both sliding elements can be connected with one another in the opening of the vibration-damping ring.

In another aspect of the present invention, one of the sliding elements has a slotted hollow shaft with spring-mounted parts with an outer edge bead, and another sliding element having a hollow shaft with an inner edge bead in which the outer edge bead can fit over the inner edge bead. According to a still further aspect of the present invention, the vibration-damping ring is of rubber or plastic, in particular of silicone.

According to an aspect of the invention, a vibration-damping device for removably connecting a first and second component is provided. The device includes a holding arm adapted to be attached to the first component; a receiving element adapted to be attached to the second component; and at least one vibration-damping element of elastic material coupled to the holding arm. The holding arm is insertable into the receiving element, whereby the at least one vibration-damping element is slidable along at least a surface of the receiving element.

According to another aspect of the present invention an external surface of the at least one vibration-damping element comprises a sliding head which forms a sliding fit with the receiving element or the holding device. Additionally, other aspect of the present invention include at least one vibration-damping element that is one of cylindrically-shaped or in the form of a vibration-damping ring.

In another aspect of the present invention, at least one sliding element is interfit inside a central axial receiving hole of the at least one vibration-damping element. According to a further aspect of the present invention, the at least one sliding element has a sliding head which rises above the central axial receiving hole of the at least one vibration-damping element.

According to a further aspect of the present invention, the sliding head has a convex shape. In another aspect of the present invention, a sliding element is located on both sides of the central axial receiving hole of the vibration-damping element. According to a still further aspect of the present invention, both sliding elements can be connected with one another within the central axial receiving hole of the vibration-damping ring element.

In another aspect of the present invention, one of the sliding elements has a slotted hollow shaft with spring-mounted arms, with each arm having an outer edge bead, and the other of the sliding elements has a hollow shaft with an inner edge bead which snaps over the outer edge bead of the spring-mounted arms. According to a still further aspect of the present invention, the holding arm further comprises a tongue-shaped member having a hole at a distal end, the hole adapted for receiving the at least one vibration damping element.

Further aspects of the invention include a receiving element in the form of a hollow section. According to other aspects of the present invention, the holding arm comprises a piston device and holes for receiving the at least one vibration-damping element, and the receiving element comprises a hollow cylinder. According to another aspect of the present invention, the holding arm has a hole and the vibration-damping ring has a concentric peripheral groove adapted to receive an edge of the hole of the holding arm.

According to a still further aspect of the invention, the receiving element has a hole and the vibration-damping ring has a concentric peripheral groove adapted to be received by an edge of the hole of the receiving element. According to an additional aspect of the present invention, the damping element is made of one of rubber, plastic, and silicone.

According to an aspect of the present invention, a vibration-damping device for removably connecting a first and second component. The device comprises a holding arm adapted to be attached to the first component; a resilient vibration-damping element adapted to be attached to a distal end of the holding arm; and a receiving element adapted to be attached to a second component and removably connected to the holding arm. The holding arm projects into the receiving element, and a removable connection is formed by a sliding fit between the vibration-damping element and the receiving element.

According to another aspect of the present invention, the holding arm includes a tongue-shaped member having, a receiving hole in the distal end, a flange connected to an opposite end of the tongue-shaped member for attachment to the first component, and a stiffening gusset connected to: the tongue-shaped member and the flange. In another aspect of the present invention, the flange has at least one or more mounting holes.

In another aspect of the present invention, the holding arm includes a tongue-shaped member having a receiving hole in the distal end, a flange connected to an opposite end of the tongue-shaped member for attachment to the first component, and a stiffening edge connected to an outer perimeter edge of the tongue-shaped member and to an outer perimeter edge of the flange.

According to a still further aspect of the present invention, the vibration-damping element is ring-shaped having a central axial receiving hole and a peripheral concentric groove, wherein the groove is adapted to be received by a receiving hole of the holding arm. In another aspect of the present invention, the vibration-damping element further so includes a neck which connects the peripheral concentric groove to a main portion of the vibration-damping element, wherein the neck is narrower in comparison to a cross sectional thickness of material which forms the peripheral concentric groove.

According to a still further aspect of the present invention, at least one sliding element is attached to an external surface of the vibration-damping element to enhance the sliding fit between the vibration-damping element and the receiving element. Further aspects of the invention, the at least one sliding element has a convex-shaped head.

According to another aspect of the present invention, an upper and lower sliding element are attached to a central axial receiving hole of the vibration-damping element.

According to an aspect of the present invention, the upper and lower sliding element are snapped together inside the central axial receiving hole. Additionally, other aspects include a receiving element is a tube having a rectangular cross-section adapted to receive the vibration-damping elements internally within the tube to form the sliding fit.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several view of the drawings, and wherein.

DETAILED DESCRIPTION OF THE PRESENT INVENTION

The particulars shown herein are by way of examples and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figures 1A, 2A:
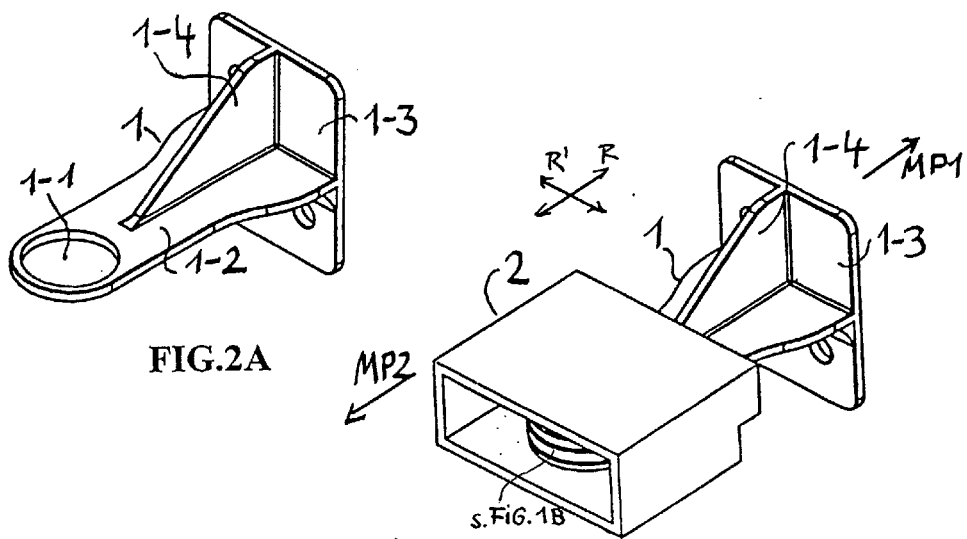
FIG. 1A shows a diagrammatic perspective view of the connection arrangement according to the invention with holding arm located movably in a receiving element, and to which a vibration-damping ring with sliding elements is attached.
FIG. 2A shows a perspective view of a first version of the holding arm.

FIG. 1A shows a diagrammatic perspective view of the connection arrangement according to the invention with a holding arm (1) located movably in a receiving element (2) in the form of a hollow section, and on which a vibration-damping ring (3) with sliding elements (4) is located. Details of the vibration-damping ring are described in connection with FIG. 3A to 3C and details of the sliding elements in connection with FIG. 4A and 4B.

The holding arm (1) can be connected with a first component MP1, which is not shown. The receiving element (2) can be connected with a second component MP2, which is not shown, inasmuch as the holding arm and the receiving element (2) are not part of the first or second components themselves. When the components MP1 and MP2 are moved in relation to one another (here in a horizontal direction R/R') the holding arm 1 also moves in relation to the receiving element (2). Further, movement of the holding arm in relation to the receiving element at an angle of inclination deviating slightly from the horizontal is also included.

Figure 1C:
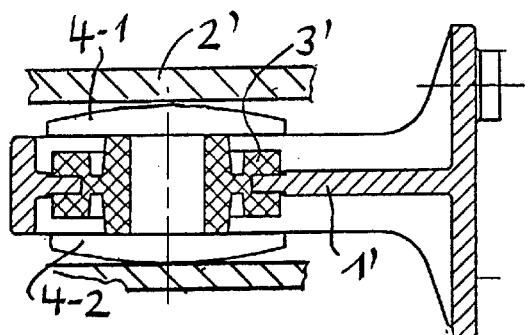
FIG. 1C shows a partial section view of the connection arrangement according to the invention for a vibration-damping ring according to FIG. 3C and for sliding elements according to FIG. 4A and FIG. 4B.

During this movement, sliding elements (FIG. 4A and FIG. 4B) attached to the holding arm slide along the upper and lower interior wall of the receiving element in the form of a hollow section. These sliding elements are located in a vibration-damping ring (3; 3' in FIG. 1B; FIG. 1C) mounted on the holding arm 1. For purposes of vibration damping, the sliding elements 4-1, 4-2 are not directly connected with the holding arm (1) (1'). Undesirable vibrations occurring in a component are transmitted to the other component, if at all, in damped form.

FIG. 2A shows a perspective view of a first version of the holding arm (1). This holding arm has a tongue-like part 1-2 which is connected with a flange-like part 1-3 via stiffeners 1-4. Part 1-3 serves for connection with the first component MP1 (not shown).

A hole 1-1 is located at the free end of the tongue-like part 1-2. It serves to receive a vibration-damping ring 3 (or 3') shown in FIGS. 3A to 3C. The vibration-damping ring has a peripheral concentric groove N (or N'). The vibration-damping ring is mounted in the opening 1-1 of the holding arm in such a way that the edge of opening fits into the groove N (N'). The mounting of the vibration-damping ring in the hole 1-1 presents no difficulty because it is made of elastic material e.g. of rubber or plastic, preferably silicone.

Figure 3A:
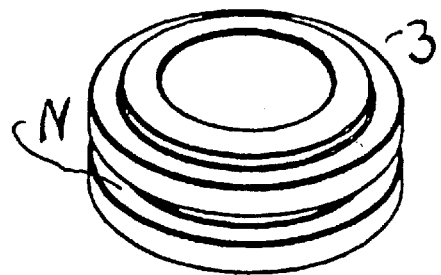
FIG. 3A shows a perspective view of a vibration-damping ring.
Figure 3B:
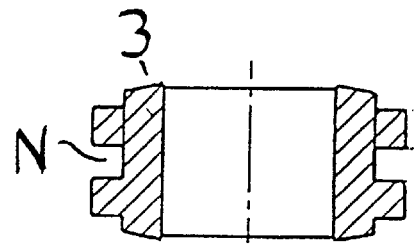
FIG. 3B shows a section view the vibration-damping ring according to FIG. 3A.

The vibration-damping ring may be designed in different ways. FIG. 3A shows a perspective view of a first version of the vibration-damping ring, whose section view is also shown in FIG. 3B. Here, the groove N is part of the actual ring wall, contrary to FIG. 3C.

Figure 3C:
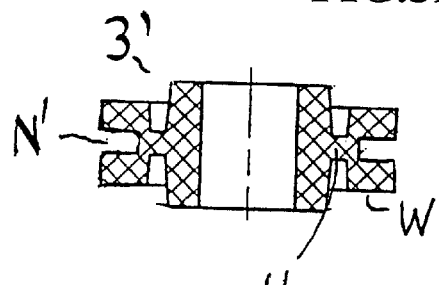
FIG. 3C shows a section view of another version of the vibration-damping ring.

FIG. 3C shows a section view of another version of the vibration-damping ring, in which a bead W is connected by the groove N' by a connection H which is narrow in relation to the bead to the actual wall of the ring. This version is particularly effective in damping vibrations because of the additional ability to vibrate of the "narrow-necked" bead.

Figure 1B:
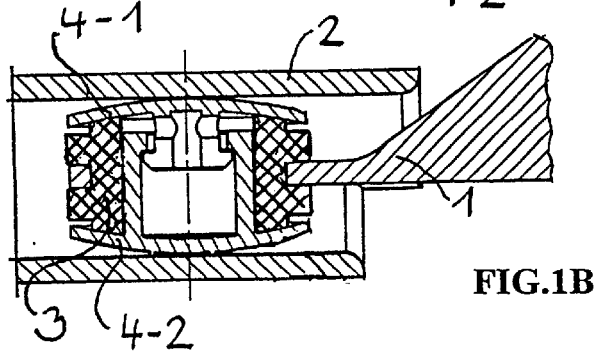
FIG. 1B shows a partial section view of the connection arrangement according to the invention for a vibration-damping ring according to FIG. 3A, FIG. 3B and for sliding elements according to FIG. 4A and FIG. 4B.
Figure 4A:
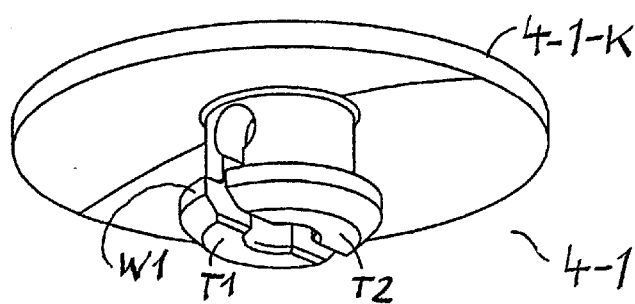
FIG. 4A shows a perspective view of two connectable sliding elements.
Figure 4A:
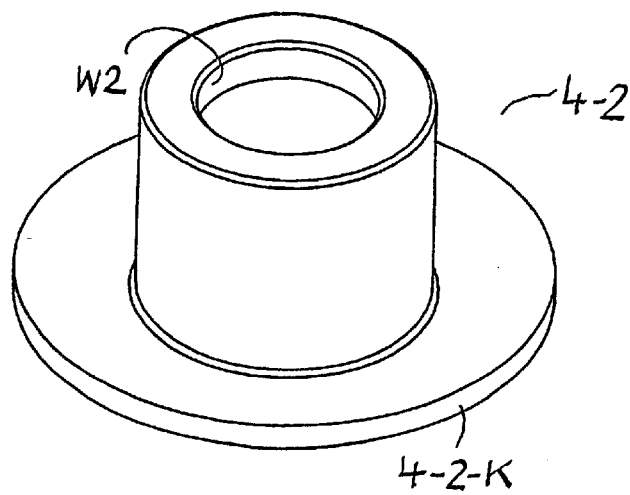
Figure 4B:
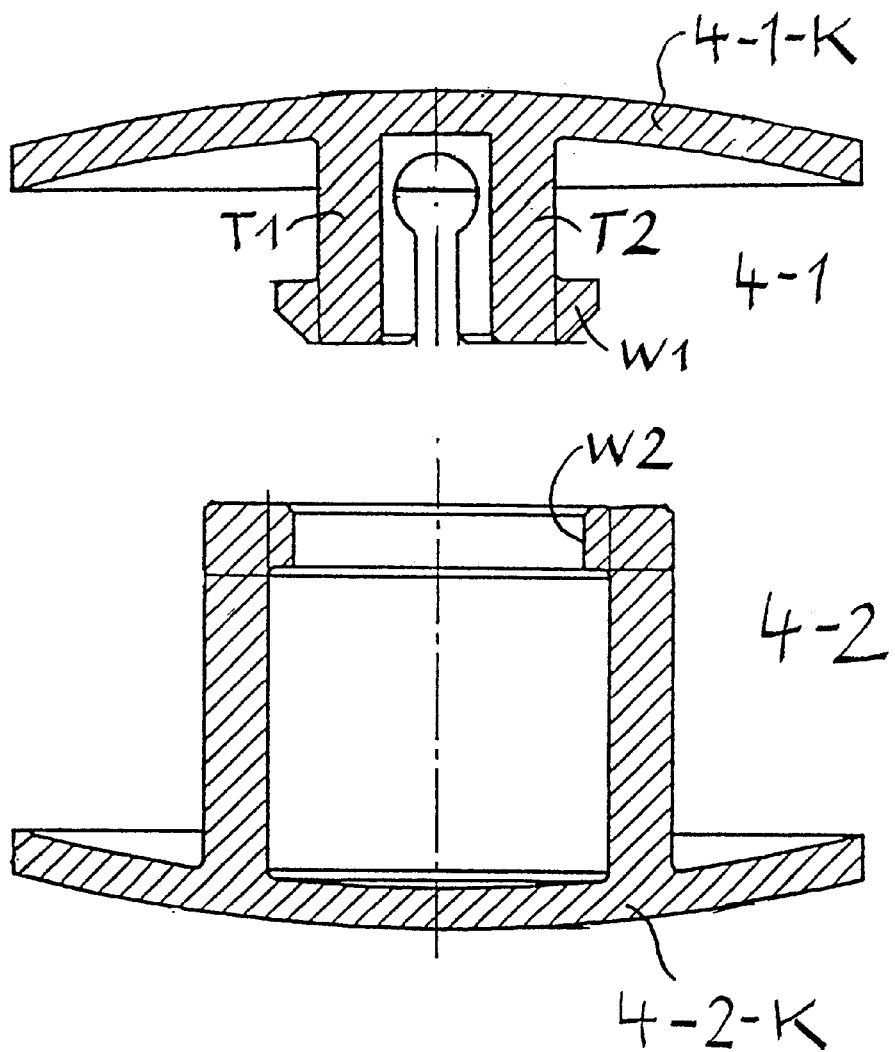
FIG. 4B shows a section view of the sliding elements according to FIG. 4A.

FIG. 1B shows a partial section view of the connection arrangement according to the invention for a vibration-damping ring (3) according to FIG. 3A and FIG. 3B and for sliding elements 4-1 and 4-2 according to FIG. 4A and FIG. 4B.

An upper sliding element (4-1) and a lower sliding element (4-2) are, located on the upper and lower side of the vibration-damping ring (3). Both these elements are connected inside the opening of the vibration-damping ring by a snap connection.

Each of the sliding elements has a mushroom-like convex head. This touches the inner wall of the hollow section (2) and can be moved on it. Through this ability to move, any movements occurring between the components are compensated.

The upper sliding element 4-1 (FIG. 4A, FIG. 4B) has a slotted shaft with two spring-loaded parts T1 and T2 with an outer edge bead W1 (the slotted shaft may also have more than two spring-loaded parts).

The lower sliding element 4-2 has a hollow shaft with an inner bead. When the slotted shaft of the upper sliding element is inserted into the hollow shaft of the lower sliding element, the parts T1 and T2 are temporarily pressed inwards. As soon as the edge bead W1 is behind the edge bead W2, the parts T1 and T2 move outwards and the snap connection is effected.

The sliding elements can also be connected with one another in another way. The upper and lower edge of the vibration-damping ring contacts closely the undersides of the heads of the sliding elements, which are connected with one another. FIG. 1C shows a partial section view of the connection arrangement according to the invention for a vibration-damping ring 3' according to FIG. 3C and for sliding elements according to FIG. 4A and FIG. 4B.

Figure 2B:
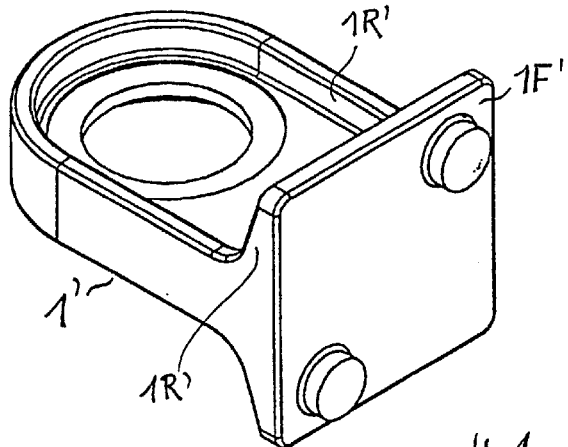
FIG. 2B shows a perspective view of a second version of the holding arm.

FIG. 2B shows a perspective view of a second version of the holding arm 1'. Here, the tongue-like part with the sliding elements mounted on its upper and lower side, is stiffened towards the edge (1R') with the mounting flange (1F'). The edge on the tongue tip also serves as an impact guard for the vibration-damping ring when the holding arm is inserted into the receiving element.

The invention is not restricted to the example versions shown. It is also possible to arrange the vibration-damping ring buffered sliding elements on the receiving element and not on the holding element. Any number of other vibration-damping elements can be used in place of the vibration-damping ring, e.g. cylinder-shaped elements which may for example, be attached to the holding arm or receiving element by adhesive bonding.

The sliding elements may even be omitted if the vibration-damping elements themselves have areas suitable for sliding which they can slide along the inner wall of the receiving element or on the holding arm. The holding arm may for example be piston-shaped and the receiving element designed like a hollow cylinder.

In addition, the vibration-damping ring does not have to have a sliding element on both sides. A single-sided version is adequate for a number of applications. Also, the vibration-damping ring can be mounted on one side only of the holding arm or in the receiving element, e.g. by bonding or other suitable methods.

It is noted that the foregoing examples have been provided merely for the purpose of explanation and are in no way to be construed as limiting of the present invention. While the present invention has been described with reference to certain embodiments, it is understood that the words, which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent strictures, methods and uses, such as are within the scope of the appended claims.

What is claimed is:

1. A vibration-damping device for removably connecting a first and second component, said device comprising:
    a holding arm adapted to be attached to the first component;
    a receiving element, having at least one planar surface, adapted to be attached to the second component; and
    at least one vibration-damping element of elastic material fixedly coupled to said holding arm;
    wherein said holding arm and said at least one vibration-damping element are insertable into said receiving element, whereby said at least one vibration-damping element is slidably positionable along the at least one planar surface of said receiving element, and wherein an external surface of said at least one vibration-damping element comprises a sliding head which forms a sliding fit with said at least one planar surface of said receiving element.

2. A vibration damping device for removably connecting a first and second component, said device comprising:
  a holding arm adapted to be attached to the first component;
  a receiving element adapted to be attached to the second component;
  at least one vibration-damping element of elastic material coupled to said holding arm;
  wherein said holding arm is insertable into said receiving element, whereby said at least one vibration-damping element is slidable along at least a surface of said receiving element;
  wherein at least one sliding element is interfitted inside a central axial receiving hole of said at least one vibration-damping element;
  wherein said at least one sliding element comprises an upper sliding element located on an upperside of said central axial receiving hole and a lower sliding element located on a lower side of said central axial receiving hole;
  wherein said upper sliding element and said lower sliding element are connected with one another within said central axial receiving hole of said at least one vibration-damping element.

3. The vibration-damping device according to claim 2, wherein one of said sliding elements has a slotted hollow shaft with spring-mounted arms; each arm having an outer edge bead, and wherein the other of said sliding elements has a hollow shaft with an inner edge bead which snaps over said outer edge bead of said spring-mounted arms.

4. A vibration-damping device for removably connecting a first and second component, said device comprising:
  a holding arm adapted to be attached to the first component;
  at least one resilient vibration-damping element adapted to be fixedly attached to a distal end of said holding arm; and
  a receiving element, having at least one planar surface, adapted to be attached to a second component and removably connected to said holding arm;
  wherein said holding arm and said at least one resilient vibration-damping element projects into said receiving element, and a removable connection is formed by a sliding fit between said at least one resilient vibration-damping element and said at least one planar surface of said receiving element;
  wherein said holding arm comprises a tongue-shaped member having a receiving hole in said distal end, a flange connected to an opposite end of said tongue-shaped member for attachment to said first component, and a stiffening gusset connected to said tongue-shaped member and said flange.

5. The vibration-damping device according to claim 4, wherein said flange has at least one or more mounting holes.

6. A vibration-damping device for removably connecting a first and second component, said device comprising:
  a holding arm adapted to be attached to the first component;
  at least one resilient vibration-damping element adapted to be fixedly attached to a distal end of said holding arm; and
  a receiving element, having at least one planar surface, adapted to be attached to a second component and removably connected to said holding arm;
  wherein said holding arm and said at least one resilient vibration-damping element project into said receiving element, and a removable connection is formed by a sliding fit between said at least one resilient vibration-damping element and said at least one planar surface of said receiving element, and
  wherein said at least one resilient vibration-damping element is ring-shaped having a central axial receiving hole and a peripheral concentric groove, wherein said groove is adapted to be received by a receiving hole of said holding arm.

7. The vibration-damping device according to claim 6, wherein said holding arm comprises a tongue-shaped member having a receiving hole in said distal end, a flange connected to an opposite end of said tongue-shaped member for attachment to the first component, and a stiffening edge connected to an outer perimeter edge of said tongue-shaped member and to an outer perimeter edge of said flange.

8. The vibration-damping device according to claim 6, wherein said vibration-damping element further comprises a neck which connects said peripheral concentric groove to a main portion of said vibration-damping element, wherein said neck is narrower in comparison to a cross sectional thickness of material which forms said peripheral concentric groove.

9. A vibration-damping device for removably connecting a first and second component, said device comprising:
  a holding arm adapted to be attached to the first component;
  at least one resilient vibration-damping element adapted to be fixedly attached to a distal end of said holding arm; and
  a receiving element, having at least one planar surface, adapted to be attached to a second component and removably connected to said holding arm;
  wherein said holding arm and said at least one resilient vibration-damping element project into said receiving element, and a removable connection is formed by a sliding fit between said at least one resilient vibration-damping element and said at least one planar surface of said receiving element, and
  wherein at least one sliding element is attached to an external surface of said at least one resilient vibration-damping element to enhance the sliding fit between said at least one resilient vibration-damping element and said at least one planar surface of said receiving element.

10. The vibration-damping device according to claim 9, wherein said at least one sliding element has a convex-shaped head.

11. The vibration-damping device according to claim 9, wherein said at least one sliding element comprises upper and lower sliding elements attached to a central axial receiving hole of said at least one resilient vibration-damping element.

12. A vibration-damping device for removably connecting a first and second component, said device comprising:
  a holding arm adapted to be attached to the first component;
  at least one resilient vibration-damping element adapted to be fixedly attached to a distal end of said holding arm; and
  a receiving element, having at least one planar surface, adapted to be attached to a second component and removably connected to said holding arm;

wherein said holding arm and said at least one resilient vibration-damping element projects into said receiving element, and a removable connection is formed by a sliding fit between said at least one resilient vibration-damping element and said at least one planar surface of said receiving element;

wherein at least one sliding element is attached to an external surface of said at least one resilient vibration-damping element to enhance the sliding fit between said at least one resilient vibration-damping element and said at least one planar surface of said receiving element;

wherein upper and lower sliding elements are attached to a central axial receiving hole of said at least one resilient vibration-damping element; and wherein said upper and lower sliding elements are snapped together inside said central axial receiving hole.

13. A vibration-damping device for removably connecting a first and second component, said device comprising:

a holding arm adapted to be attached to the first component;

at least one resilient vibration-damping element adapted to be fixedly attached to a distal end of said holding arm; and a receiving element, having at least one planar surface, adapted to be attached to a second component and removably connected to said holding arm;

wherein said holding arm and said at least one resilient vibration-damping element project into said receiving element, and a removable connection is formed by a sliding fit between said at least one resilient vibration-damping element and said at least one planar surface of said receiving element, and wherein said receiving element is a tube having a rectangular cross-section adapted to receive said at least one resilient vibration-damping element internally within said tube to form the sliding fit.

* * * * *